United States Patent
Listle

(10) Patent No.: US 7,756,628 B2
(45) Date of Patent: Jul. 13, 2010

(54) NAVIGATION SYSTEM INCLUDING A DRIVE FOR READING OUT NAVIGATION DATA AND A METHOD FOR OPERATING A NAVIGATION SYSTEM

(75) Inventor: Holger Listle, Hildesheim (DE)

(73) Assignee: Robert Bosch GmbH, Stuttgart (DE)

( * ) Notice: Subject to any disclaimer, the term of this patent is extended or adjusted under 35 U.S.C. 154(b) by 922 days.

(21) Appl. No.: 10/590,228

(22) PCT Filed: Jan. 7, 2005

(86) PCT No.: PCT/EP2005/050054
§ 371 (c)(1),
(2), (4) Date: Aug. 21, 2006

(87) PCT Pub. No.: WO2005/083701
PCT Pub. Date: Sep. 9, 2005

(65) Prior Publication Data
US 2007/0179707 A1 Aug. 2, 2007

(30) Foreign Application Priority Data
Feb. 26, 2004 (DE) .................. 10 2004 009 273

(51) Int. Cl.
*G01C 21/00* (2006.01)
*G06F 19/00* (2006.01)
(52) U.S. Cl. ..................... 701/200; 369/30.05
(58) Field of Classification Search .............. None
See application file for complete search history.

(56) References Cited

U.S. PATENT DOCUMENTS

| 5,467,327 | A | | 11/1995 | Jamail et al. | |
|---|---|---|---|---|---|
| 5,930,209 | A | * | 7/1999 | Spitzenberger et al. | 369/30.05 |
| 5,995,457 | A | * | 11/1999 | Jamail | 369/30.04 |
| 6,081,897 | A | * | 6/2000 | Bersson | 726/32 |
| 6,560,403 | B1 | * | 5/2003 | Tanaka et al. | 386/95 |
| 6,618,335 | B2 | * | 9/2003 | Tanaka et al. | 369/53.21 |
| 6,992,959 | B1 | * | 1/2006 | Tosaki et al. | 369/53.21 |
| 7,362,677 | B2 | * | 4/2008 | Morimoto et al. | 369/53.21 |
| 2003/0084313 | A1 | | 5/2003 | Tada | |

FOREIGN PATENT DOCUMENTS

| EP | 1 227 482 | 7/2002 |
|---|---|---|
| WO | WO 97/44736 | 11/1997 |

OTHER PUBLICATIONS

"Überblick: Alle Kopierschutzmethoden" CHIP Online, 'Online! Feb. 11, 2002, found on the Internet: www.chip..de.
"Information Technology—Data interchange on read-only 120 mm optical data disks (CD-ROM), 1$^{st}$ edition" Sep. 1, 1989, International Standard ISO/IEC 10149, Geneva, Switzerland.

* cited by examiner

*Primary Examiner*—Michael J. Zanelli
(74) *Attorney, Agent, or Firm*—Kenyon & Kenyon LLP

(57) ABSTRACT

A navigation system including a drive for reading out navigation data which is stored on a data medium. In addition to the navigation data, a pregap is present on the data medium in which identification data is stored. The drive is designed in such a way that it is able to read CD information in the pregap and compares the identification data stored in the pregap to predefined data to allow or deny access to the navigation data.

10 Claims, 2 Drawing Sheets

NAVIGATION SYSTEM INCLUDING A DRIVE FOR READING OUT NAVIGATION DATA AND A METHOD FOR OPERATING A NAVIGATION SYSTEM

FIELD OF THE INVENTION

The present invention relates to a navigation system including a drive for reading out navigation data which is stored on a data medium. A pregap exists on the data medium in addition to the navigation data. The present invention also relates to a method for operating a navigation system including a drive for reading out navigation data from a data medium which in addition has a pregap, logically ranked above the navigation data.

BACKGROUND INFORMATION

In order to protect digital data media, CD-ROMs in particular, from unauthorized duplication, a plurality of commercial products for preventing duplication without impairing the compatibility with the wide variety of existing play-back devices are available on the market. However, the conventional methods may be circumvented with more or less effort, so that there is a risk of unauthorized duplication and usage of such data media duplicated without authorization.

SUMMARY

An object of the present invention is to provide a navigation system and a method for operating a navigation system using which effective copy protection for data media with navigation data may be provided.

According to an example embodiment of the present invention, due to the fact that identification information, which may be read out by the drive, is stored in the pregap of the data medium, it is possible that usage of the navigation data on the data medium may be linked to the existence of such identification data or the existence of correct identification data. Since the standard duplicating equipment is not in the position to identify a pregap and copy it, an appropriate design of the pregap content makes it possible to restrict usage or to grant a usage right. The rest of the navigation data may be read out only when the identification data, e.g., a copyright note, is actually present in the pregap. Furthermore, it may be provided that a usage authorization is issued only when very specific identification data is present, i.e., the rest of the navigation data may only be read out when the identification data is compatible with verification data stored in the navigation system.

Data media may thus be manufactured for a specific device or a line of devices. Even if the pregap could also be duplicated, the usage of the data medium would be restrictable to a certain line of models or to certain serial numbers of the respective navigation devices. Duplication would thereby lose its appeal since it would not be able to be ensured that the duplicated data media would actually function in the present device.

A refinement of the present invention provides that the data media are designed as CD-ROMs since they are widely used, robust, and easy to operate. Of course, alternative data media, such as a DVD, may be used, as long as the drive is able to recognize the data formats.

The pregap is advantageously provided with the physical address 0:00.0, and at the end of the pregap which is at the physical address 0:02.0, for example, the logical addressing starts with address 0 in order to prevent access by conventional CD burners or other duplicating equipment. The start of the pregap would theoretically have the logic block address −150. That part of the data medium, which in ISO 9660 data systems cannot be addressed due to logic block addressing instead of physical addressing, is understood to be the pregap. The usage authorization data, identification data, or a copyright is stored in this pregap which has a length of two seconds, for example. Only in the presence of this data is the rest of the data released.

BRIEF DESCRIPTION OF THE DRAWING

An example of the present invention is explained in greater detail in the following based on the Figures.

DETAILED DESCRIPTION OF EXAMPLE EMBODIMENTS

Figure 1:
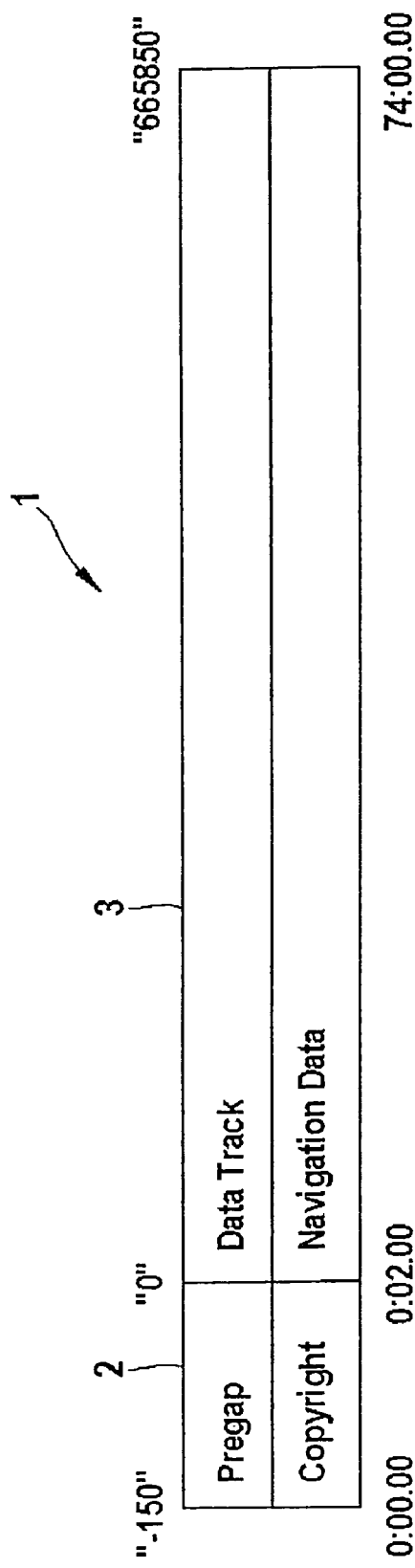
FIG. 1 shows a schematic representation of the data structure on a data medium.

FIG. 1 shows a data track 1 which is composed of a pregap 2 and a useful data track 3. The physical address of pregap 2 as well as of useful data track 3 is plotted below data track 1. At the start of pregap 2, the physical address is made up of zeros, namely 0 min runtime and 0 sec runtime at frame 0. A runtime of two seconds has elapsed at the end of pregap 2, the physical address 00 being indicated as the frame. Useful data track 3 including the navigation data, which occupies the remaining memory space, follows pregap 2, the remaining memory space being 74 minutes on a regular CD, which can be seen in the lower right corner of FIG. 1. The last logic block address "665850" is shown in the upper right corner of FIG. 1.

At the start, pregap 2 is provided with the physical address 0:00.0 and at the end of the pregap, which is at the physical address 0:02.0, logic addressing, which is plotted on top, starts with the address 0 in order to prevent access by conventional CD burners or other duplicating equipment. The start of the pregap would theoretically have the logic block address "−150." Only after the pregap, useful data track 3 starts with the appropriate logic block addresses "0" to "665850."

The read drive used (not shown) is able to read pregap 2 of a CD even though pregap 2 in ISO 9660 data systems cannot be addressed due to the deviating type of addressing (logic block addressing instead of physical addressing).

The program implemented here adds a two-second data block 2 in which a copyright is stored, for example, to the finished navigation CD. It is now possible to burn CDs having a predefined pregap 2 using which the existence of the copyright in the navigation system may be checked. If the copyright does not exist, the CD will be rejected. Duplication of this CD using a standard CD burner is not possible.

Figure 2:
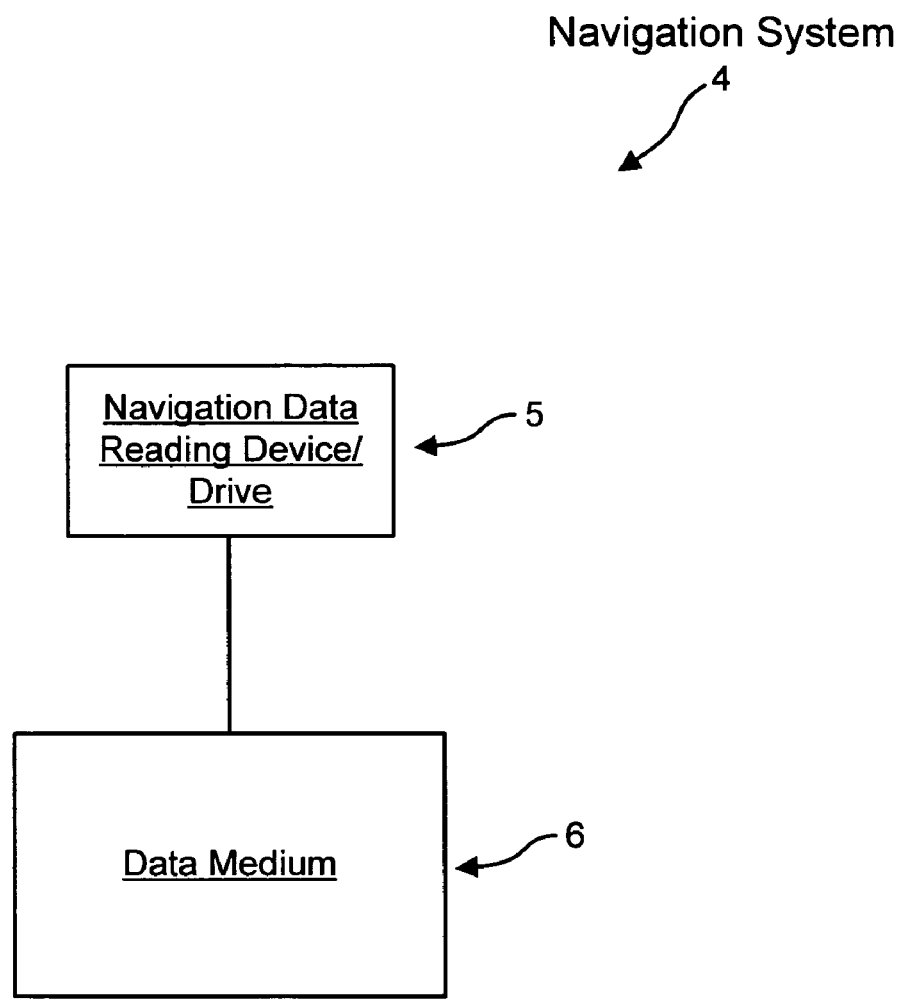
FIG. 2 shows a schematic representation of the navigation data reading device/drive and the data medium.

FIG. 2 shows a schematic representation of the navigation system 4 having the navigation data reading device/drive 5 and the data medium 6.

What is claimed is:

1. A copy-protected navigation drive system, comprising:
a drive for reading out navigation data; and
a data medium configured to store the navigation data, a pregap being present on the data medium in addition to the navigation data, where identification information is stored in a pregap of the data medium, the drive being configured to read the identification information in the pregap.

2. The navigation system as recited in claim 1, wherein the data medium is a CD-ROM.

3. The navigation system as recited in claim 1, wherein the pregap ranks above logic block address "0".

4. The navigation system as recited in claim 1, wherein a copyright note is stored in the pregap.

5. The navigation system as recited in claim 1, wherein the data medium is a CD-ROM, wherein the pregap ranks above logic block address "0", and wherein a copyright note is stored in the pregap.

6. A navigation system with copy-protected data, comprising:
- a navigation data reading device;
- a data medium storing navigation data, including a pregap configured to be ignored by standard duplicating equipment, during a duplicating process;
- wherein the pregap includes identification information corresponding to copyright privileges or limits,
- wherein the navigation data reading device includes a serial number, and
- wherein the navigation data of a particular data medium is exclusively readable by a navigation data reading device having a particular serial number.

7. The navigation system of claim 6, wherein the data medium storing navigation data includes logical addressing, and wherein the logical address zero is located at an end of the pregap.

8. A computer readable medium having a computer program, which is executable by a processor, for copy-protecting a computerized navigation system, comprising:
- a computer code program arrangement having program code for copy-protecting the computerized navigation system by performing the following:
  - receiving a data medium storing navigation data in a main portion and including a pregap storing copyright information;
  - checking the pregap for a condition; and
  - reading the navigation data if the condition is met and denying a read of the navigation data if the condition is not met.

9. The computer readable medium of claim 8, wherein the condition is met when there is a pregap and when the pregap includes copyright information.

10. The computer readable medium of claim 8, wherein a navigation data reading device for reading the navigation data includes a serial number, and wherein the condition is met when the copyright information corresponds to a particular serial number associated with the navigation data reading device.

* * * * *